INVENTOR.
R. Nistri

April 17, 1962

R. NISTRI 3,029,632

ELECTRONIC INDICATOR OF REMAINING RANGE, IN TERMS
OF TIME OR DISTANCE OR OTHER CONVEYANCES
DRIVEN BY LIQUID-FUEL ENGINES

Filed Sept. 11, 1956

2 Sheets-Sheet 2

INVENTOR.
R. Nistri

BY Richards & Geier

ATTORNEYS

United States Patent Office 3,029,632
Patented Apr. 17, 1962

3,029,632
ELECTRONIC INDICATOR OF REMAINING RANGE, IN TERMS OF TIME OR DISTANCE OR OTHER CONVEYANCES DRIVEN BY LIQUID-FUEL ENGINES
Raffaello Nistri, Via della Vasca Navale 81, Rome, Italy
Filed Sept. 11, 1956, Ser. No. 609,229
Claims priority, application Italy July 21, 1956
5 Claims. (Cl. 73—113)

The invention described herein concerns a device which indicates the remaining range of an aircraft or other conveyances, driven by liquid-fuel engines. Remaining range is understood herein to mean the length of time for which the conveyance can continue to operate, assuming that the speed of the engine is maintained constant at the rate prevailing at the time when the indication is read, or the distance which can be covered with the fuel left in the tanks, again assuming a constant rate of engine speed.

Depending on whether the remaining range is expressed in terms of length of time or distance which can be covered, the apparatus assumes different forms. In turn, each solution presents a variant, the description of which is made hereafter with reference to the enclosed drawings which represent, as a non-limiting example, preferred embodiments of this invention.

Figure 1:
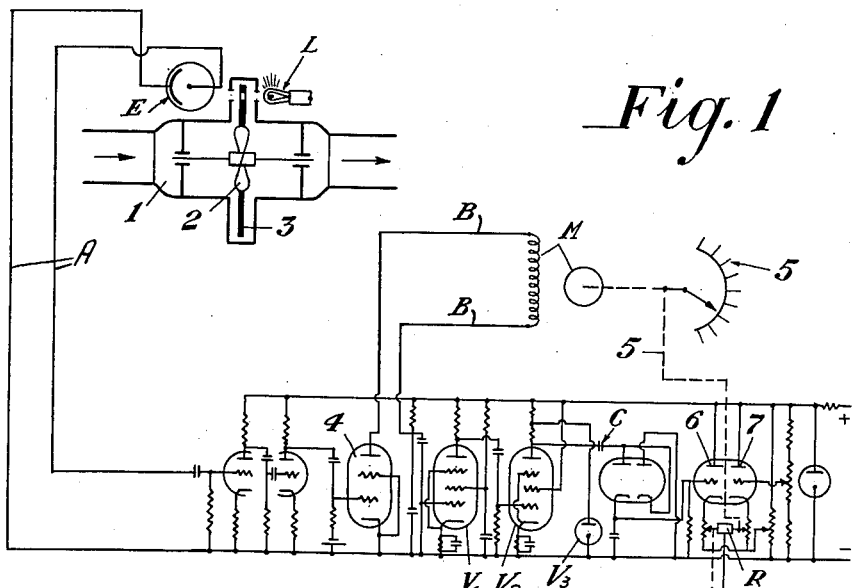
Figure 2:
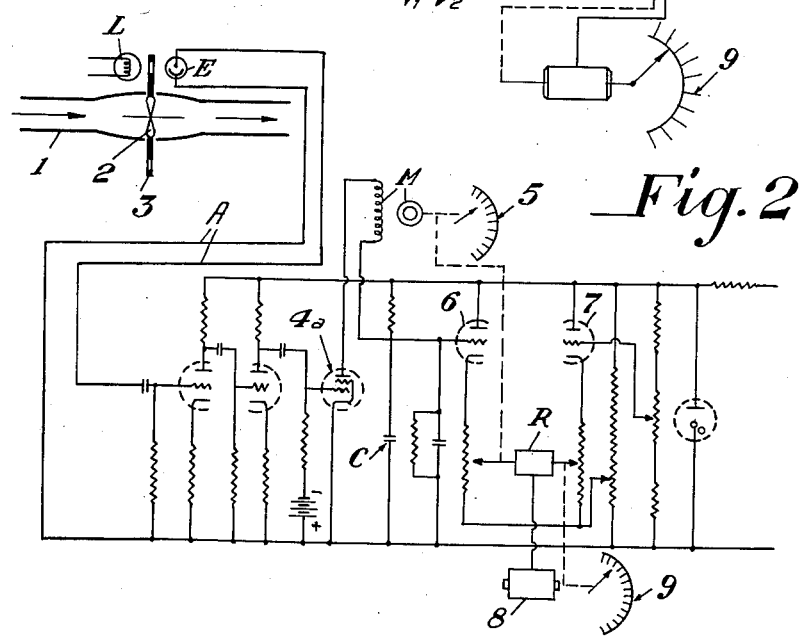
Figure 3:
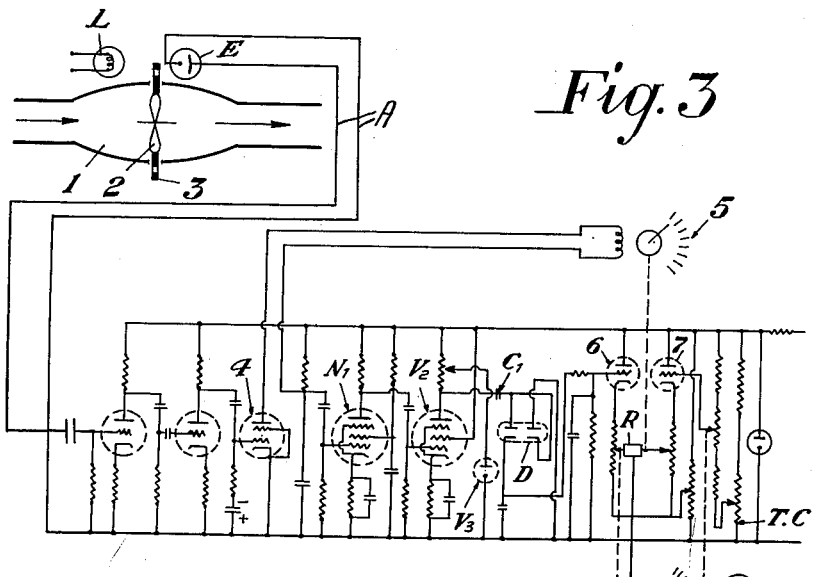
Figure 4:
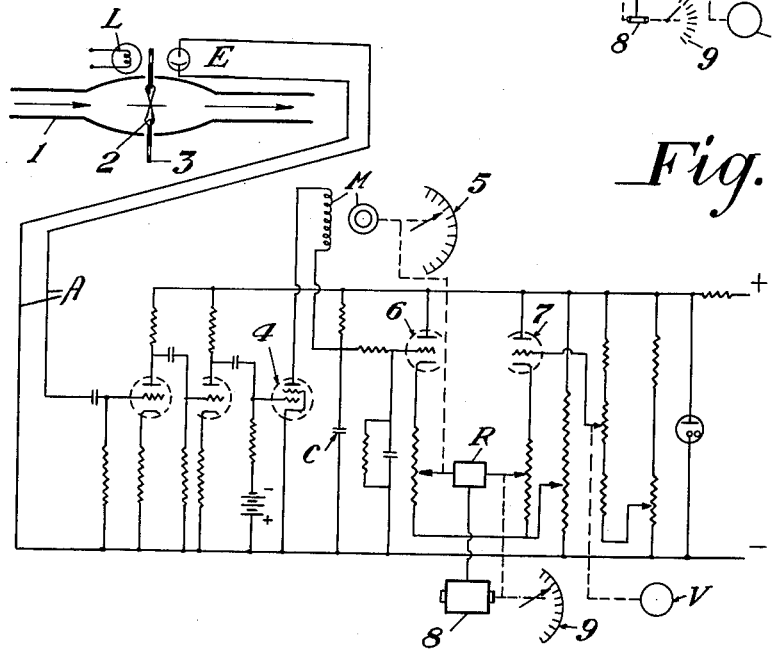

In the drawings:
FIG. 1 represents an indicator of remaining range in terms of hours of operation;
FIG. 2 represents another indicator of remaining range in terms of hours of operation, according to a variant;
FIG. 3 represents an indicator of remaining range in terms of distance which can be covered;
FIG. 4 represents a variant of the indicator shown in FIG. 3.

With reference to the figures, the indicator comprises a flow meter for the purpose of measuring the quantity of fuel burned by the engine, an amplifier and a calculating device.

FIG. 1 represents, as mentioned above, an indicator of remaining range in terms of hours of operation.

The flow meter consists of a pipe 1 which conveys the fluid in the directions indicated by the arrows. The pipe is fitted with a cavity in which are housed the components marked 2 and 3, the former being the rotor 2 which, as the fuel flows through the pipe 1, is driven into rotation at a speed which is directly proportional to the velocity of the fluid; the latter consists of a disk 3 fastened to the rotor 2, peripherally fitted with holes through which passes a beam of light from the bulb L aimed at the photo-electric cell E. The latter generates signals which are directly proportional to the speed of the rotor 2, and consequently to the rate of fuel flow.

The signals thus generated are fed into the first stage of the amplifier, which is designed to raise them to a sufficient strength to control reliably the following stage. The latter consists of a gas-filled tube 4, which allows a current to circulate in the winding of the motor M, which will rotate by a certain angle for each pulse. The sum of the pulses received by the motor represents the equivalent of the quantity of fuel which has flowed through the rotor 2.

The following stage comprises the electronic tubes V1, V2, V3, arranged to convert a signal of variable amplitude into another of the same frequency but of constant amplitude, in order to obtain an operation independent of the voltage of the signal and dependent exclusively upon its frequency. Thereupon, the signal is fed into a double diode, through the first section of which passes the charging current of condenser C1, and through the second the discharge current. It ensues that the current is directly proportional to the number of charging cycles of condenser C1, at the terminals of which there will be a voltage directly proportional to the fuel flow.

In the remaining fuel indicator 5, driven by the motor M, is fitted a potentiometer connected to the needle of the instrument, which regulates the voltage in proportion to the quantity of fuel remaining. The connections at the ends of the potentiometer are made in such a way that the slide is positioned on the cathode side at the moment the aircraft takes off, and moves towards the negative conductor during flight, reaching said negative conductor when the whole fuel supply has run out. This requires that at the take-off, the fuel reservoir be full and that the slide be brought to a position showing on scale 5 that the reservoir has been filled up. Motor M integrates the fuel flow and supplies, by moving the slide, a voltage proportional to the quantity of fuel consumed. Such voltage is subtracted from the voltage on the whole potentiometer, by the correct connection, thus obtaining a voltage which is proportional to the difference between the whole initial fuel supply and the fuel consumed, i.e. the remaining fuel. The division between these two voltages, the first being proportional to the quantity of remaining fuel and the second directly proportional to the fuel flow, is effected by means of a circuit similar to a Wheatstone bridge, two sides of which being formed by two triodes 6 and 7, with cathode transfer functions. The unbalance voltage, through an auxiliary circuit R controls a miniature motor 8, which restores the balance of the bridge. A needle actuated by the motor gears indicates, on a graduated scale 9, the range in hours, understood as a quotient between the fuel remaining in the tanks and the instant consumption of the engine.

As can be understood from the foregoing, the calculation is made exclusively on the basis of the angular speed of the flow-metering rotor, after introducing the quantity of fuel existing on departure, which is a constant value for each aircraft or other conveyance. The electronic circuit of the bridge is arranged in such a way as to make the operation largely independent of the power supply voltage. The photocell system of measuring the angular speed of the rotor offers considerable advantages because the rotor revolves freely and consequently at a speed strictly proportional to the velocity of the fuel. Consequently, since the system of calculation embodied in the range-measuring amplifier depends exclusively upon the operation of the flow meter, the instrument yields highly precise indications of the remaining quantity of fuel and of the remaining range in hours.

With special reference to FIG. 2, the drawing represents a variant of the indicator of remaining range in terms of hours of operation, as described above. In this variant, the flow meter is the same as described above, while the gas-filled tube 4a has two functions, the first of which being to feed a current into motor M for each pulse received, as indicated above. For each of these pulses, the motor will rotate by a certain angle, and the sum of the pulses will correspond to the quantity of fuel which has flowed through the rotor 2. The second function of the gas-filled tube is that of short-circuiting the condenser C, the instantaneous charge of which depends upon the frequency. This is caused in that the condenser is in parallel between the plate and the cathode of the gas tube 4a. When the tube is waiting for signal its internal resistance is much greater than the charge resistance of the condenser. Under these conditions the condenser acquires a voltage which depends on the time during which it remains under charge. When a signal is applied to the grid, the tube is energized and consequently its internal resistance grows very small, and the energy stored in the condenser is discharged through the tube. The instantaneous voltage in the condenser, therefore will be inversely proportional to the fuel flow.

In the remaining fuel indicator 5, driven by the motor M, is fitted a potentiometer connected in the needle of the instrument, which makes it possible to adjust the voltage in proportion to the remaining quantity of fuel. The voltage at the terminals of the condenser attains a maximum value which depends in an almost direct line upon the interval of time between one discharge and the other. Therefore the average voltage on the grid of the first cathode follower is proportional to the duration or inversely proportional to the frequency of the impulses, i.e., to the number of revolutions accomplished in a second by rotor 2, and consequently to the fuel flow.

Owing to the properties of the cathode follower, a voltage is obtained which is nearly equal to the voltage on the grid. The voltage at the terminals of the potentiometer in the cathode circuit of the first cathode follower is then inversely proportional to the fuel flow; the voltage drawn from the slide of the potentiometer, which is connected to the integrating mandrel is proportional, for any flow, to the remaining fuel and, therefore, since the potentiometer acts as a resistance, the voltage is proportional to the product of the remaining fuel for the inverse of the flow, i.e., it is proportional to the remaining range. The slide of the potentiometer placed in the cathode of the second cathode follower follows and repeats the voltage of the slide of the first potentiometer, therefore the needle operatively connected to the slide of the second potentiometer shows the remaining range on its own scale. The slides in the two potentiometers are mechanically independent of each other; between them there is electrically connected galvanometric relay R which suitably commutes the feeding of motor 8; said motor moves the slide of one of the said potentiometers in the correct direction, to bring relay R into a rest position. Thus both slides are brought to the same voltage. The multiplication between these two voltages, the first of which is proportional to the remaining quantity of fuel and the second is inversely proportional to the fuel flow, is effected, as described above.

All the other arrangements are exactly the same as those described in the preceding case.

FIG. 3 represents another residual range indicator, the indications of which are not expressed in terms of remaining flight or running time, but in terms of the number of kilometers which can still be covered, assuming that the speed of the engine and the speed of the conveyance remain constant.

The devices are substantially the same, and in the figures the components which have a similar or identical function are marked with the same indices.

In this device the gas-filled tube 4 has the same function as in the device illustrated in FIG. 1 and the same applies to all other components, such as tubes V1, V2, V3, the double diode D, the condenser C the indicator of remaining fuel 5 and the two cathode-transfer triodes 6 and 7.

In the arrangement described here the first triode is fed with a voltage directly proportional to the fuel flow, while the second triode is fed with a voltage proportional to the speed of the aircraft or conveyance, as furnished by the speed indicator V. To this voltage there can be added a correction voltage TC, manually adjusted to compensate for disturbing effects.

Through the auxiliary circuit R, the unbalance voltage drives a miniature motor 8 which restores the bridge to a position of balance. A needle actuated by the motor gear shows the range in kilometers on the scale 9.

The electronic circuit of the bridge is arranged in such a way as to make the operation largely independent of the power supply voltage.

The device shown in FIG. 4 is a variant of that shown in FIG. 3, and furnishes the same indications with respect to the residual distance range of aircraft or other conveyances.

In this last arrangement, the gas-filled tube 4 has the same twofold functions described with respect to FIG. 2, and also the other components and their functions are identical, except for the fact that the first of the triodes 6 and 7 is fed with a voltage inversely proportional to the speed of the aircraft or conveyance, supplied by speed indicator V, and to this voltage there can be previously added a correction voltage TC, manually adjusted to allow for disturbing effects. The other considerations are the same as those made with respect to the other arrangements described above.

What I claim is:

1. An indicator of the remaining operational range of a liquid-fuel engine, said indicator comprising in combination with a flowmeter having a pipe, a rotor located within said pipe and adapted to be driven by fuel flowing through the pipe, the speed of rotation of said rotor being directly proportional to the velocity of the flow, and means connected with said rotor for generating electrical impulses directly proportional to the speed of said rotor; an impulse amplifier connected with said means, an electric motor having a winding; a fuel indicator driven by said motor, a gas-filled tube connected with said impulse amplifier and the winding of said motor and circulating a current through the winding to cause rotation of said motor by a predetermined angle for each pulse of the current, whereby the sum of pulses received by the motor represents the equivalent of the quantity of fuel flowing through the flowmeter, a condenser, means connecting said condenser with said gas-filled tube, and a Wheatstone bridge circuit including two cathode transfer triodes, said cathode transfer triodes forming two sides of the Wheatstone bridge, a potentiometer connected with said fuel indicator and one of said cathode transfer triodes, means connecting said cathode transfer triodes to said condenser, an auxiliary circuit connected to said cathode transfer triodes and receiving the unbalance voltage of the Wheatstone bridge, a motor connected with said auxiliary circuit for restoring the balance of the Wheatstone bridge, and an indicator actuated by the last-mentioned motor.

2. An indicator of the remaining operational range of a liquid-fuel engine, said indicator comprising in combination with a flowmeter having a pipe, a rotor located within said pipe and adapted to be driven by fuel flowing through the pipe, the speed of rotation of said rotor being directly proportional to the velocity of the flow, and means connected with said rotor for generating electrical impulses directly proportional to the speed of said rotor; an impulse amplifier connected with said means, an electric motor having a winding; a fuel indicator driven by said motor, a gas-filled tube connected with said impulse amplifier and the winding of said motor and circulating a current through the winding to cause rotation of said motor by a predetermined angle for each pulse of the current, whereby the sum of pulses received by the motor represents the equivalent of the quantity of fuel flowing through the flowmeter, a plurality of interconnected electronic tubes connected with said gas-filled tube and converting electrical signals of variable amplitude into those of constant amplitude, a condenser, means connecting said condenser to one of said plurality of electronic tubes, the voltage at the terminals of said condenser being directly proportional to the fluid flow, a double diode connected with said condenser and having a section receiving the charging current of said condenser and another section receiving the discharge current, and a Wheatstone bridge circuit including two cathode transfer triodes, said cathode transfer triodes forming two sides of the Wheatstone bridge, a potentiometer connected with said fuel indicator and one of said cathode transfer triodes, means connecting said cathode transfer triodes to said double diode, whereby the Wheatstone bridge circuit is affected by two voltages, one of which is proportional to the flow of the remaining fuel and the other directly proportional to the fuel flow, an auxiliary circuit connected to said cathode transfer triodes and receiving the unbalance voltage of the Wheatstone bridge, a motor connected with said auxiliary circuit for restoring the balance of the Wheatstone bridge, and an indicator actuated by the last-mentioned motor for indicating the range in hours.

3. An indicator of the remaining operational range of a liquid-fuel engine, said indicator comprising in combination with a flowmeter having a pipe, a rotor located within said pipe and adapted to be driven by fuel flowing through the pipe, the speed of rotation of said rotor being directly proportional to the velocity of the flow, and means connected with said rotor for generating electrical impulses directly proportional to the speed of said rotor; an impulse amplifier connected with said means, an electric motor having a winding; a fuel indicator driven by said motor, a gas-filled tube connected with said impulse amplifier and the winding of said motor and circulating a current through the winding to cause rotation of said motor by a predetermined angle for each pulse of the current, whereby the sum of pulses received by the motor represents the equivalent of the quantity of fuel flowing through the flowmeter, a condenser, means connecting said condenser with said gas-filled tube to cause said gas-filled tube to short-circuit said condenser, whereby the instantaneous voltage in said condenser is inversely proportional to the fluid flow, and a Wheatstone bridge circuit including two cathode transfer triodes, said cathode transfer triodes forming two sides of the Wheatstone bridge, a potentiometer connected with said fuel indicator and one of said cathode transfer triodes, means connecting said cathode transfer triodes to said condenser, whereby the Wheatstone bridge circuit is affected by two voltages, one of which is proportional to the remaining quantity of fuel and the other inversely proportional to the fuel flow, an auxiliary circuit connected to said cathode transfer triodes and receiving the unbalance voltage of the Wheatstone bridge, a motor connected with said auxiliary circuit for restoring the balance of the Wheatstone bridge, and an indicator actuated by the last-mentioned motor for indicating the range in hours.

4. An indicator of the remaining operational range of a liquid-fuel engine, said indicator comprising in combination with a flowmeter having a pipe, a rotor located within said pipe and adapted to be driven by fuel flowing through the pipe, the speed of rotation of said rotor being directly proportional to the velocity of the flow, and means connected with said rotor for generating electrical impulses directly proportional to the speed of said rotor; an impulse amplifier connected with said means, an electric motor having a winding; a fuel indicator driven by said motor, a gas-filled tube connected with said impulse amplifier and the winding of said motor and circulating a current through the winding to cause rotation of said motor by a predetermined angle for each pulse of the current, whereby the sum of pulses received by the motor represents the equivalent of the quantity of fuel flowing through the flowmeter, a plurality of interconnected electronic tubes connected with said gas-filled tube and converting electrical signals of variable amplitude into those of constant amplitude, a condenser, means connecting said condenser to one of said plurality of electronic tubes, the voltage at the terminals of said condenser being directly proportional to the fluid flow, a double diode connected with said condenser and having a section receiving the charging current of said condenser and another section receiving the discharge current, and a Wheatstone bridge circuit including two cathode transfer triodes, said cathode transfer triodes forming two sides of the Wheatstone bridge, a potentiometer connected with said fuel indicator and one of said cathode transfer triodes, means connecting one of said cathode transfer triodes to said double diode, whereby said one cathode transfer triode receives voltage directly proportional to the fuel flow, a speed indicator, means connecting said speed indicator with the other one of said cathode transfer triodes, whereby said other cathode transfer triode receives voltage proportional to the speed, manually adjustable means connected with the last-mentioned means for adding a correction voltage to the last-mentioned voltage, an auxiliary circuit connected to said cathode transfer triodes and receiving the unbalance voltage of the Wheatstone bridge, a motor connected with said auxiliary circuit for restoring the balance of the Wheatstone bridge, and an indicator actuated by the last-mentioned motor for indicating the range in terms of distance.

5. An indicator of the remaining operational range of a liquid-fuel engine, said indicator comprising in combination with a flowmeter having a pipe, a rotor located within said pipe and adapted to be driven by fuel flowing through the pipe, the speed of rotation of said rotor being directly proportional to the velocity of the flow, and means connected with said rotor for generating electrical impulses directly proportional to the speed of said rotor; an impulse amplifier connected with said means, an electric motor having a winding; a fuel indicator driven by said motor, a gas-filled tube connected with said impulse amplifier and the winding of said motor and circulating a current through the winding to cause rotation of said motor by a predetermined angle for each pulse of the current, whereby the sum of pulses received by the motor represents the equivalent of the quantity of fuel flowing through the flowmeter, a condenser, and a Wheatstone bridge circuit including two cathode transfer triodes, said cathode transfer triodes forming two sides of the Wheatstone bridge, a potentiometer connected with said fuel indicator and one of said cathode transfer triodes, means connecting one of said cathode transfer triodes to said condenser, a speed indicator, means connecting said speed indicator with the other one of said cathode transfere triodes, whereby said other cathode transfer triode receives voltage inversely proportional to the speed, manually adjustable means connected with the last-mentioned means for adding a correction voltage to the last-mentioned voltage, an auxiliary circuit connected to said cathode transfer triodes and receiving the unbalance voltage of the Wheatstone bridge, a motor connected with said auxiliary circuit for restoring the balance of the Wheatstone bridge, and an indicator actuated by the last-mentioned motor.

References Cited in the file of this patent

UNITED STATES PATENTS

| | | |
|---|---|---|
| 2,623,389 | Van Oosterom | Dec. 30, 1952 |
| 2,656,977 | Cummings | Oct. 27, 1953 |
| 2,697,348 | Bevins | Dec. 21, 1954 |
| 2,955,464 | Elwell | Oct. 11, 1960 |